3,051,733
DI-17α(Δ⁴-ANDROSTEN-17β-OL-3-ONE) BUTADIYNE
John A. Zderic, Palo Alto, Calif., and Pierre Crabbé, Mexico City, Mexico, assignors, by mesne assignments, to Syntex Corporation, a corporation of Panama
No Drawing. Filed Oct. 3, 1961, Ser. No. 142,482
5 Claims. (Cl. 260—397.4)

The present invention relates to novel cyclopentanophenanthrene compounds and to a process for the production thereof.

More particularly the present invention relates to di-17α(Δ⁴-androsten-17β-ol-3-one) butadiyne derivatives.

The novel compounds of the present invention which exhibit anti-gonadotrophic, anti-estrogenic and anti-ovulatory properties are represented by the following formula:

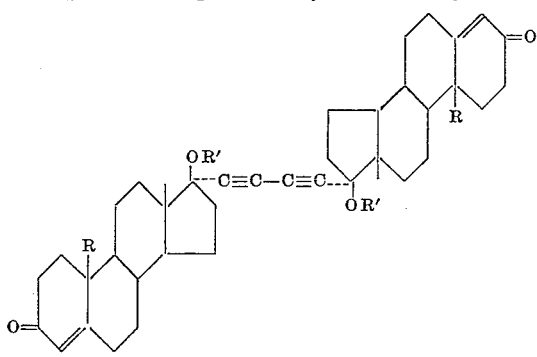

In the above formula R represents hydrogen or methyl; $R^1$ represents hydrogen or a hydrocarbon carboxylic acyl group of less than 12-carbon atoms.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process illustrated by the following equation:

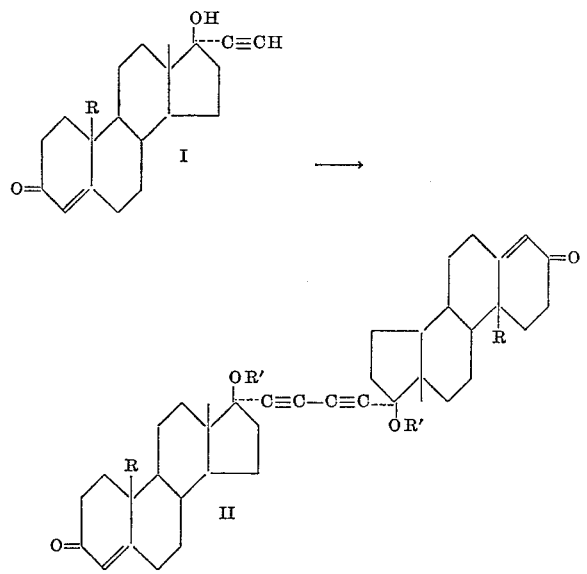

In practicing the process just outlined the 17α-ethynyl-testosterone or the 19-nor derivative thereof (I) is treated with cupric acetate in a suitable solvent such as pyridine, at approximately 50° C. for a period of time of the order of 3 hours thus furnishing the corresponding di-17α(Δ⁴-androsten-17β-ol-3-one) butadiyne derivative (II;$R^1$=H). This derivative is conventionally acylated with an excess of an acylating agent as for example acetic anhydride or caproic anhydride, affording the corresponding 17β-acyloxy compound (II; $R^1$=acyloxy).

The following specific examples serve to illustrate but are not intended to limit the scope of the present invention.

Example I

To 500 ml. of pyridine containing 5 g. of 17α-ethynyl-testosterone, there were added 75 g. of cupric acetate. The resulting mixture was kept at 50° C. for 3 hours with constant stirring. After cooling the mixture was filtered and the precipitate washed with benzene. The combined filtrates were evaporated almost to dryness under vacuum. After dilution with benzene, the solution was washed with water, dilute acid and water, then dried over sodium sulfate, treated with active charcoal, filtered and the filtrate concentrated to a small volume, whereupon there crystallized di-17α(Δ⁴-androsten-17β-ol-3-one) butadiyne.

Following the same procedure there was treated 17α-ethynyl-19-nor-testosterone, affording di-17α(19-nor-Δ⁴-androsten-17β-ol-3-one) butadiyne.

Example II

A mixture of 1 g. of di-17α(Δ⁴-androsten-17β-ol-3-one) butadiyne, 1 g. of p-toluenesulfonic acid monohydrate, 50 cc. of acetic acid and 25 cc. of acetic anhydride was kept for 24 hours at room temperature. It was then poured into water and stirred until the excess of anhydride had hydrolyzed. Isolation of the product by methylene chloride extraction and crystallization of the residue from acetone-ether gave di-17α(Δ⁴-androsten-17β-ol-3-one-17-acetate) butadiyne.

By the same technique there was treated di-17α(19-nor-Δ⁴-androsten-17β-ol-3-one) butadiyne thus affording di-17α(19-nor-Δ⁴-androsten-17β-ol-3-17-acetate) butadiyne.

Example III

Using the same conditions described in Example II, but substituting acetic anhydride by propionic anhydride, there were treated di-17α-(Δ⁴-androsten-17β-ol-3-one) butadiyne and di-17α(19-nor-Δ⁴-androsten-17β-ol-3-one) butadiyne furnishing respectively di-17α(Δ⁴-androsten-17β-ol-3-one-17-propionate) butadiyne and di-17α(19-nor-Δ⁴-androsten-17β-ol-3-one-17-propionate) butadiyne.

Example IV

Following the technique described in Example II, but substituting acetic anhydride by caproic anhydride and cyclopentylpropionic anhydride, there were correspondingly obtained the caproates and cyclopentylpropionates of the starting compounds of Example III.

We claim:
1. A compound of the following formula:

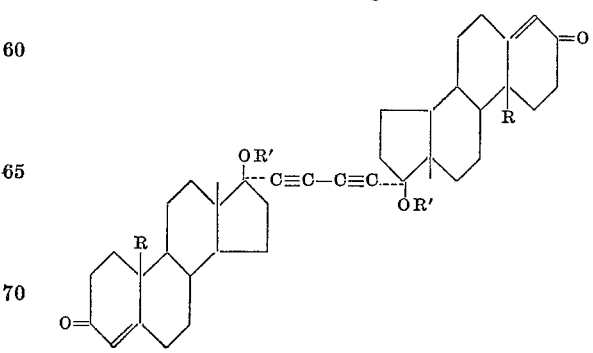

wherein R is a member of the group consisting of hydrogen and methyl and $R^1$ is selected from the group consisting of hydrogen and a hydrocarbon carboxylic acid of less than 12 carbon atoms.

2. Di-17α($Δ^4$-androsten-17β-ol-3-one) butadiyne.

3. Di-17α(19-nor - $Δ^4$ - androsten-17β-ol-3-one) butadiyne.

4. Di-17α($Δ^4$-androsten-17β-ol-3-one-17-acetate) butadiyne.

5. Di-17α(19-nor - $Δ^4$ - androsten-17β-ol-3-one-17-acetate) butadiyne.

No references cited.